US012668447B2

(12) United States Patent
Kim et al.

(10) Patent No.: US 12,668,447 B2
(45) Date of Patent: Jun. 30, 2026

(54) ELECTRODE MATERIAL WINDING APPARATUS

(71) Applicant: LG ELECTRONICS INC., Seoul (KR)

(72) Inventors: Jonghun Kim, Seoul (KR); Hyunbae Cho, Seoul (KR); Kunsu Park, Seoul (KR); Changsub Lim, Seoul (KR); Hyojeong Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 19/118,587

(22) PCT Filed: Oct. 5, 2022

(86) PCT No.: PCT/KR2022/014954
§ 371 (c)(1),
(2) Date: Apr. 4, 2025

(87) PCT Pub. No.: WO2024/075861
PCT Pub. Date: Apr. 11, 2024

(65) Prior Publication Data
US 2026/0008641 A1     Jan. 8, 2026

(51) Int. Cl.
| | |
|---|---|
| *B65H 18/16* | (2006.01) |
| *B65H 18/14* | (2006.01) |
| *B65H 18/26* | (2006.01) |
| *B65H 23/04* | (2006.01) |
| *B65H 23/18* | (2006.01) |
| *H01M 10/04* | (2006.01) |

(52) U.S. Cl.
CPC ....... *B65H 23/1813* (2013.01); *B65H 18/145* (2013.01); *B65H 18/16* (2013.01); *B65H 18/26* (2013.01); *B65H 23/048* (2013.01); *H01M 10/0409* (2013.01); *B65H 2301/51* (2013.01); *B65H 2515/34* (2013.01)

(58) Field of Classification Search
CPC ...... B65H 18/16; B65H 18/26; B65H 18/145; B65H 23/1813; H01M 10/0409
See application file for complete search history.

(56) References Cited

U.S. PATENT DOCUMENTS

| | | | |
|---|---|---|---|
| 8,702,818 B2* | 4/2014 | Sohn | ........................ H01M 4/70 429/211 |
| 9,947,956 B2* | 4/2018 | Hwang | ............. H01M 10/0409 |

(Continued)

FOREIGN PATENT DOCUMENTS

| | | |
|---|---|---|
| CN | 201270273 Y | 7/2009 |
| CN | 106257712 A | 12/2016 |

(Continued)

*Primary Examiner* — Sang K Kim
(74) *Attorney, Agent, or Firm* — Birch, Stewart, Kolasch & Birch, LLP

(57) ABSTRACT

The present specification relates to an embodiment of an electrode material winding apparatus, in which an electrode material is processed so that an electrode tab is not disposed in an impregnation region into which an electrolyte can be injected, and the electrode material is wound so that the electrode tab is arranged only in a specific region excluding the impregnation region, thereby winding the electrode material such that the electrolyte is injected through the impregnation region.

20 Claims, 7 Drawing Sheets

(56)  References Cited

U.S. PATENT DOCUMENTS

| 2002/0061435 | A1* | 5/2002 | Hisai | H01M 10/0431 |
| | | | | 429/211 |
| 2016/0036085 | A1* | 2/2016 | Choi | B65H 23/28 |
| | | | | 242/530 |
| 2016/0372779 | A1* | 12/2016 | Hwang | H01M 10/0409 |

FOREIGN PATENT DOCUMENTS

| CN | 112542641 | A | 3/2021 |
| CN | 113594556 | A | 11/2021 |
| KR | 10-2006-0085440 | A | 7/2006 |
| KR | 10-2010-0061317 | A | 6/2010 |
| KR | 10-2011-0031063 | A | 3/2011 |
| KR | 10-1569798 | B1 | 11/2015 |
| KR | 10-2016-0149794 | A | 12/2016 |
| KR | 10-2018-0048419 | A | 5/2018 |
| KR | 10-2019-0068060 | A | 6/2019 |
| KR | 10-2021-0058892 | A | 5/2021 |
| KR | 10-2022-0010167 | A | 1/2022 |

* cited by examiner

JRF

T

100

FIG. 7C
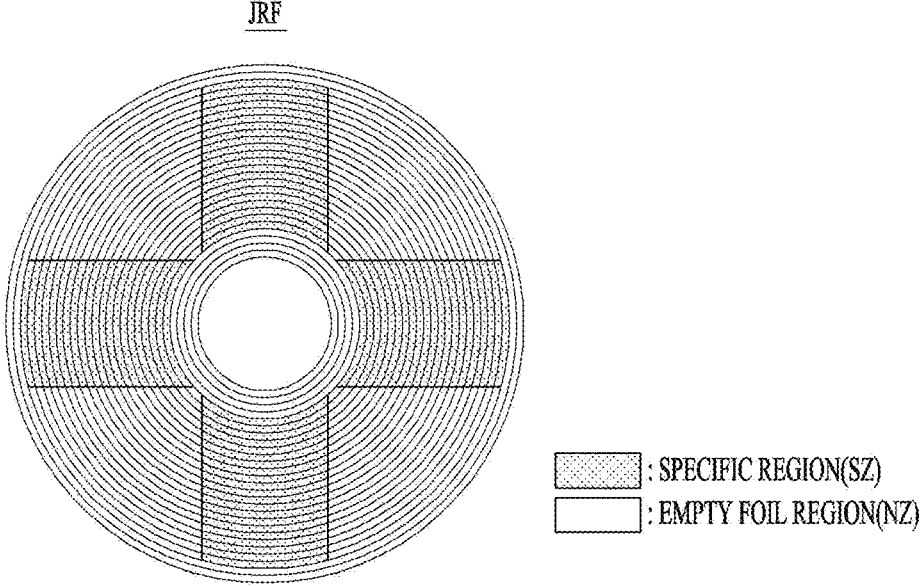
JRF
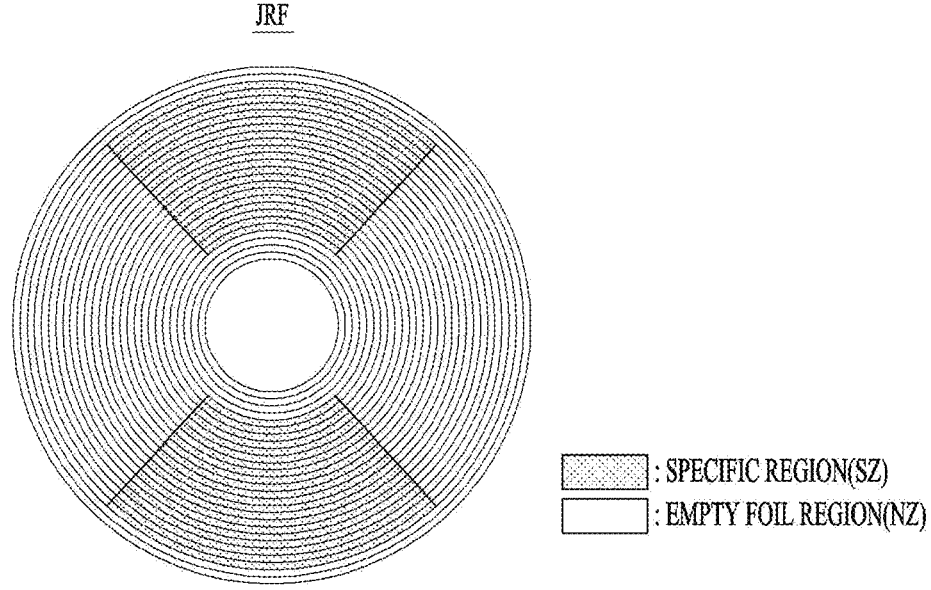
: SPECIFIC REGION(SZ)
: EMPTY FOIL REGION(NZ)
FIG. 7D
JRF
: SPECIFIC REGION(SZ)
: EMPTY FOIL REGION(NZ)

ELECTRODE MATERIAL WINDING APPARATUS

CROSS REFERENCE TO RELATED APPLICATIONS

This application is the National Phase of PCT International Application No. PCT/KR2022/014954, filed on Oct. 5, 2022, which is hereby expressly incorporated by reference into the present application.

TECHNICAL FIELD

An embodiment of the present specification relates to an electrode material winding apparatus that processes and winds an electrode material into a jelly roll.

BACKGROUND ART

Unlike primary batteries, secondary batteries can be recharged and have been extensively researched and developed in recent years due to their small size and high capacity. As technological development and demand for mobile devices increase, the demand for secondary batteries as an energy source is rapidly increasing.

Secondary batteries are classified into coin batteries, cylindrical batteries, prismatic batteries, and pouch batteries depending on the shape of the battery case. In a secondary battery, an electrode assembly mounted inside the battery case is a rechargeable power generation element consisting of a stacked structure of a cathode, a separator, and an anode. Electrode assemblies may be roughly classified into a jellyroll type in which a sheet-shaped cathode and a sheet-shaped anode coated with an active material are wound with a separator interposed therebetween, a stack type in which a plurality of cathodes and anodes are sequentially stacked with a separator interposed therebetween, and a stack/folding type in which stack-type unit cells are wound with a long length of separation film. Among them, jelly roll type electrode assemblies are widely used as having the advantage of being easy to manufacture and having a high energy density per weight.

Meanwhile, Korean Patent Publication No. 10-2021-0058892 (published on May 24, 2021) (hereinafter referred to as "prior literature") discloses a technology for electrode connection of a jelly roll type electrode assembly in which foils extending from an electrode protrude from each of top and bottom surfaces of a jelly roll, and the protruding foils are electrically connected to a connection tab (electrode plate). As described in the prior literature, a conventional jelly roll has a structure in which an electrode processed to extend foils and protrude from a cross section of the jelly roll is wound, and the protruding foils are folded to form an electrode tab, thereby electrically connecting to the connection tab at the top surface. An example of this structure is illustrated in FIG. 1.

FIG. 1 is an exemplary drawing showing a shape of a top surface of a conventional jelly roll as described in the prior literature, in which foils corresponding to an electrode tab protrude in a folded state. As illustrated in FIG. 1, the conventional jelly roll has a structure in which the protruding foils are folded so as to allow the top surface of the jelly roll to be covered with the folded foils, but due to this structure, there is a limitation in that a gap through which an electrolyte is injected becomes blocked. Due to this, additional processes or equipment for injection and impregnation of the electrolyte becomes necessary, which increases the complexity and cost of a secondary battery manufacturing process. In addition, the injection and impregnation of the electrolyte become difficult, which leads to a problem in which the performance and quality of the product are not guaranteed.

That is, the conventional jelly roll structure has a problem in that it is difficult to inject and impregnate the electrolyte, and there is a limitation in that additional processes and facilities are required, which inevitably increases the time and cost of product production. In addition, since the performance and quality of secondary battery products are not guaranteed, the utilization and application of secondary batteries in various fields are limited.

DISCLOSURE OF INVENTION

Technical Problem

An aspect of the present disclosure is intended to improve the foregoing limitations of the related art.

Accordingly, this specification is intended to provide an embodiment in which injection of an electrolyte can be easily performed during the manufacture of a secondary battery.

In addition, it is intended to provide an embodiment in which impregnation of an electrolyte can be performed without additional processes and facilities for the impregnation of the electrolyte.

Moreover, it is intended to provide an embodiment in which the arrangement of an electrode tab can be accurately performed according to the winding of the electrode material.

Besides, it is intended to provide an embodiment in which the winding of the electrode material can be flexibly performed depending on the winding state.

Solution to Problem

In order to solve the foregoing problems, an embodiment of the present specification may wind an electrode material so as to allow an impregnation region to be formed in a cross section of a jelly roll on which the electrode material is wound.

Specifically, an electrode material is processed such that an electrode tab is not arranged in an impregnation region into which an electrolyte can be injected, and the electrode material is wound such that the electrode tab is arranged only in a specific region excluding the impregnation region.

That is, an embodiment of the present specification processes an electrode material such that an electrode tab is not arranged in an impregnation region into which an electrolyte can be injected, and winds the electrode material such that the electrode tab is arranged only in a specific region excluding the impregnation area, so as to allow the electrolyte to be injected through the impregnation region, thereby solving the foregoing problems.

Such technical features may be applied and implemented in an electrode material production process, an electrode material production method, an electrode material winding process, an electrode material winding method, and a secondary battery manufacturing system, and this specification is intended to provide an embodiment of an electrode material winding apparatus having the technical features.

An embodiment of an electrode material winding apparatus having the foregoing technical features as a problem solving means, which is an electrode material winding apparatus that winds an electrode material, may include a processing unit that processes at least one end portion of upper and lower ends of the electrode material so as to allow an electrode tab connected to an electrode plate to be formed in a predetermined pattern at the end portion, a winding unit that winds the electrode material into a cylindrical jelly roll, a guide unit that comes into contact with a winding surface on which the electrode material is wound to apply a pressure to the winding surface so as to allow the electrode tab to be arranged in a specific region corresponding to a part of at least one cross section of upper and lower surfaces of the jelly roll, a detection unit that detects an input length of the electrode material introduced at a front end of the winding unit, and a control unit that determines an arrangement state of the electrode tab based on a result of the detection by the detection unit, and controls a position of the guide unit according to a result of the determination to adjust the pressure.

In an embodiment, the electrode material may include electrodes divided into a cathode and an anode and a separator that separates the cathode and the anode.

In an embodiment, the processing unit may process an end portion of a part corresponding to the electrode so as to allow the electrode tab to be formed at the end portion.

In an embodiment, the predetermined pattern may be a pattern according to a position of the electrode tab corresponding to the specific region.

In an embodiment, the predetermined pattern may be a pattern in which a formation group where one or more electrode tabs are formed and a non-formation group where the electrode tabs are not formed are alternated.

In an embodiment, the processing unit may notch the end portion so as to allow the electrode tab to be formed in the predetermined pattern.

In an embodiment, the processing unit may process, when the electrode tab is formed in the predetermined pattern and the electrode material is wound, the end portion to allow an arrangement of the electrode tab to form a predetermined shape in the cross section.

In an embodiment, the predetermined shape may be a shape in which empty foil regions where the electrode tabs are arranged below a predetermined number are formed on both sides of the specific region.

In an embodiment, the guide unit may include a roller unit that comes into contact with the winding surface to guide the winding of the electrode material, and a driving unit that is controlled by the control unit to move a position of the roller unit.

In an embodiment, the control unit may determine the arrangement state for each predetermined cycle to control a position of the guide unit.

In an embodiment, the control unit may adjust the pressure by maintaining, moving a position of the guide unit forward or backward according to the determination result.

In an embodiment, the control unit may adjust the position of the guide unit to move forward to the winding unit so as to increase the pressure, and adjust the position of the guide unit to move backward from the winding unit so as to decrease the pressure.

In an embodiment, the control unit may calculate one of standard values of the jelly roll based on the detection result, compare the standard value and a reference value according to a number of winding turns of the electrode material, and determine whether a correction of the arrangement state is required based on a result of the comparison.

In an embodiment, the control unit may determine, when a difference between the standard value and the reference value is below a first reference, that the correction of the arrangement state is not required, and maintain the position of the guide unit.

In an embodiment, the control unit may determine, when the difference between the standard value and the reference value is above the first reference, that the correction of the arrangement state is required, and move the position of the guide unit.

In an embodiment, the control unit may move the position of the guide unit forward to the winding unit when the standard value is greater than the reference value.

In an embodiment, the control unit may determine a forward distance of the guide unit according to a degree to which the standard value is greater than the reference value.

In an embodiment, the control unit may move the position of the guide unit backward from the winding unit when the standard value is smaller than the reference value.

In an embodiment, the control unit may determine a backward distance of the guide unit according to a degree to which the standard value is smaller than the reference value.

In an embodiment, the control unit may determine, when a difference between the standard value and the reference value is above a second reference that exceeds the first reference, that the correction of the specific pattern is further required, and change the setting of the processing unit.

An embodiment of the foregoing electrode material winding apparatus is not limited to those described above, and may also include embodiments described in the detailed description below or inferred/derived from the detailed description.

Advantageous Effects of Invention

An electrode material winding apparatus according to an embodiment may process and wind an electrode material so as to form an impregnation region in which an electrode tab is not arranged to inject an electrolyte, thereby having an effect of easily injecting the electrolyte through the impregnation region.

In this way, the injection of the electrolyte may be facilitated, thereby having an effect of improving the impregnation property of the electrolyte as well as performing the injection and impregnation of the electrolyte without additional processes or facilities for injection and impregnation.

In addition, the injection and impregnation of the electrolyte may be performed without additional processes and facilities, thereby simplifying the manufacturing process as well as reducing the time and cost required for the manufacturing process.

Moreover, a pressure applied to a winding surface may be adjusted according to a result of determining an arrangement state of the electrode tab, thereby having an effect of accurately performing the arrangement of the electrode tab as well as flexibly performing the winding of the electrode material according to a winding state.

Accordingly, there is an effect of accurately performing the formation of a separation between a connection region connected to an electrode plate and an impregnation region into which the electrolyte is injected, preventing a winding deviation, increasing the stability and reliability of jelly roll production, as well as guaranteeing the quality and performance of the product.

The effects according to an embodiment of the foregoing electrode material winding apparatus is not limited to those described above, and may also include effects described in the detailed description below or inferred/derived from the detailed description.

BRIEF DESCRIPTION OF DRAWINGS

FIGS. 7A to 7D are exemplary drawings a to d showing examples of cross-sectional shapes of jelly rolls wound by an electrode material winding apparatus according to an embodiment.

MODE FOR THE INVENTION

Figure 1:
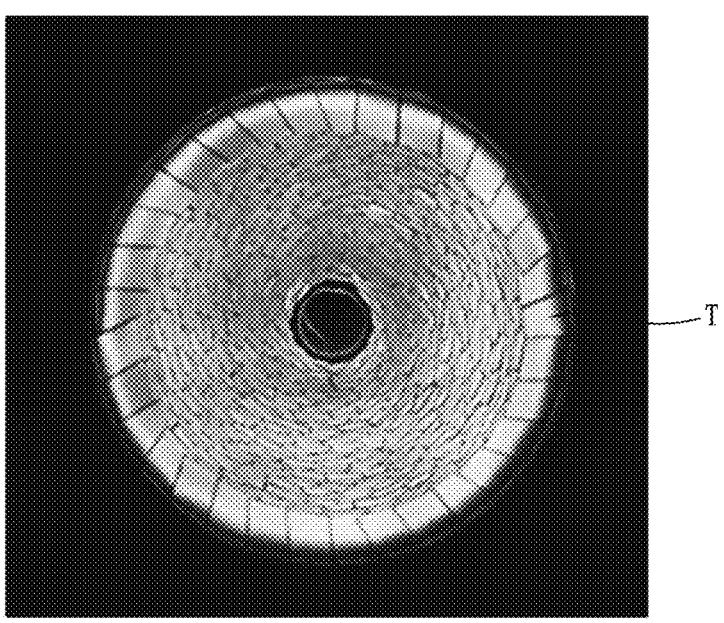
FIG. 1 is an exemplary drawing showing a shape of a top surface of a conventional jelly roll.

Hereinafter, embodiments disclosed in this specification will be described in detail with reference to the accompanying drawings, wherein the same or similar elements are designated with the same reference numerals regardless of the numerals in the drawings, and a redundant description thereof will be omitted, and moreover, in describing embodiments disclosed herein, the detailed description will be omitted when specific description for publicly known technologies to which the disclosure pertains is determined to obscure the subject matter disclosed herein.

Furthermore, the accompanying drawings are provided only for a better understanding of the embodiments disclosed in this specification and are not intended to limit technical concepts disclosed in this specification, and therefore, it should be understood that the accompanying drawings include all modifications, equivalents and substitutes within the concept and technical scope of the present disclosure.

First, a configuration of an electrode material winding apparatus according to an embodiment will be described with reference to FIGS. 2 to 3D.

The electrode material winding apparatus (hereinafter, referred to as a winding apparatus) refers to an apparatus that processes and winds an electrode material to manufacture a jelly roll.

Here, the jelly roll, which is an electrode assembly mounted inside a secondary battery, refers to an assembly formed into a cylindrical structure by winding a strip-shaped/plate-shaped electrode material.

The winding apparatus may include a plurality of process apparatuses to process and wind an electrode material supplied from the outside through an automated process.

Figure 2:
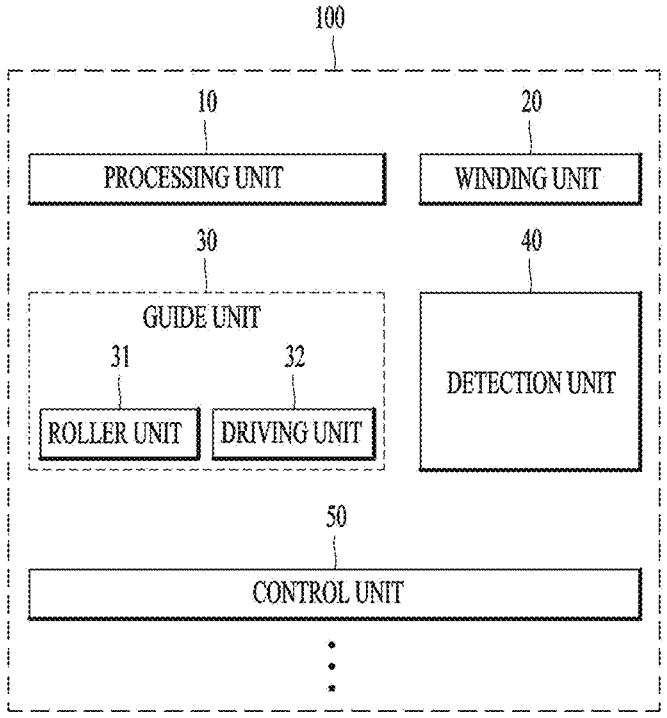
FIG. 2 is a configuration diagram of an electrode material winding apparatus according to an embodiment.

The winding apparatus 100, as illustrated in FIG. 2, includes a processing unit 10, a winding unit 20, a guide unit 30, a detection unit 40, and a control unit 50.

The processing unit 10 may be an apparatus that processes the electrode material into a form that can be wound in the winding unit 20.

The winding unit 20 may be an apparatus that winds the electrode material processed in the processing unit 10 to manufacture into a cylindrical jelly roll.

The guide unit 30 may be an apparatus that guides the winding of the electrode material by applying a pressure to the electrode material being wound in the winding unit 20.

The detection unit 40 may be an apparatus that detects an input length of the electrode material fed from the processing unit 10 to the winding unit 20.

The control unit 50 may be an apparatus that controls a driving of each of the processing unit 10, the winding unit 20, the guide unit 30, and the detection unit 40 to control an entire operation of the winding apparatus 100.

Figure 3A:
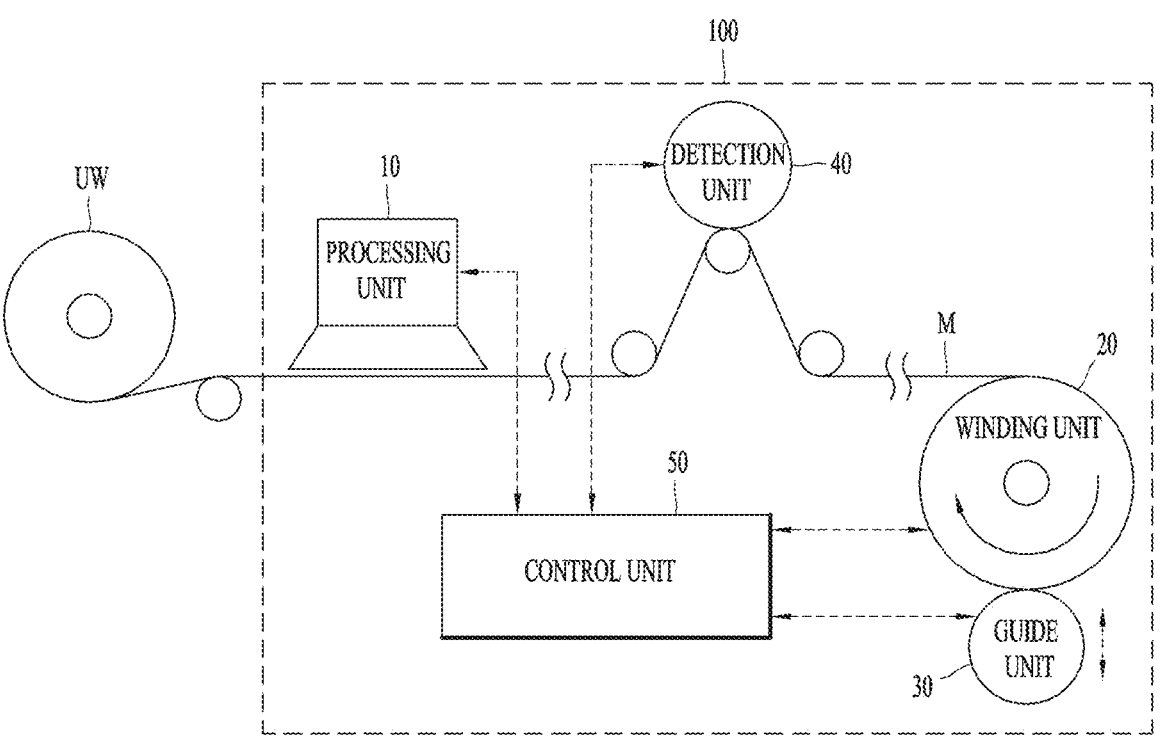
FIG. 3A is an exemplary diagram a showing a specific embodiment of the electrode material winding apparatus illustrated in FIG. 2.
Figure 3B:
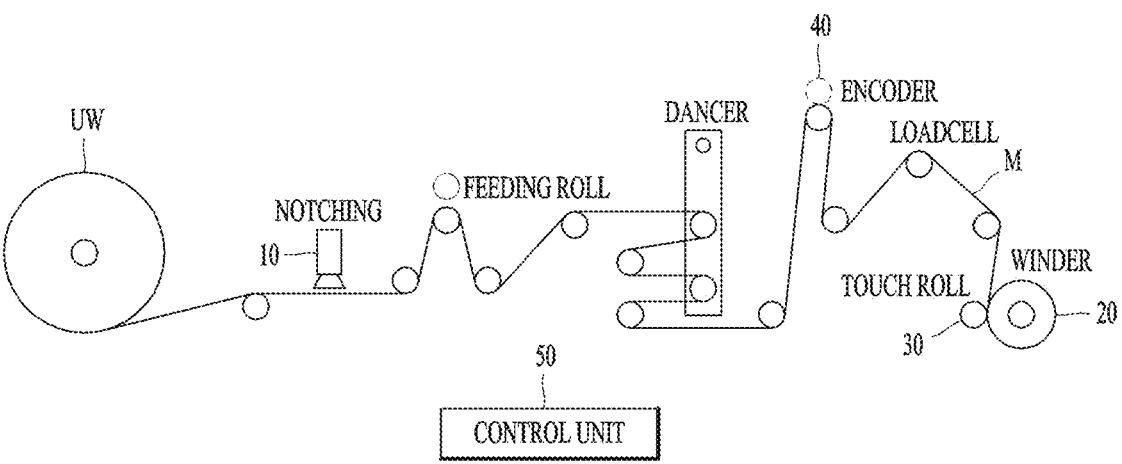
FIG. 3B is an exemplary diagram b showing a specific embodiment of the electrode material winding apparatus illustrated in FIG. 2.

As such, a specific embodiment of the winding apparatus 100 including the processing unit 10, the winding unit 20, the guide unit 30, the detection unit 40, and the control unit 50 to process and wind the electrode material M may be as illustrated in FIGS. 3A and 3B.

For the winding apparatus 100, as illustrated in FIG. 3A, the processing unit 10 may receive the electrode material M from an external electrode material supply element UW to process the electrode material M into a form that can be wound by the winding unit 20, the guide unit 30 may guide the winding of the electrode material M while the winding unit 20 winds the electrode material M processed by the processing unit 10, and when the detection unit 40 detects an input length of the electrode material M fed into the winding unit 20 to transmits it to the control unit 50, the control unit 50 may control a driving of the winding unit 20 and the guide unit 30 according to the input length.

Here, the electrode material supply element UW may be a winder apparatus that supplies the electrode material M wound into a cylindrical shape to the processing unit 10.

Meanwhile, the winding apparatus 100 including the processing unit 10, the winding unit 20, the guide unit 30, the detection unit 40 and the control unit 50, as illustrated in FIG. 3B, may further include one or more apparatuses or equipment for processing, transporting, aligning and winding the electrode material in addition to the processing unit 10, the winding unit 20, the guide unit 30, the detection unit 40 and the control unit 50.

For example, as illustrated in FIG. 3B, a plurality of rollers for transporting and aligning the electrode material M may be distributed and arranged.

Figure 4:
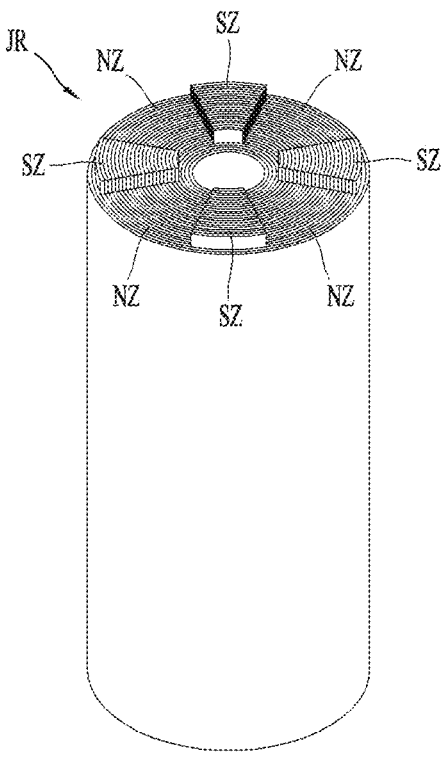
FIG. 4 is an exemplary diagram showing a shape of a jelly roll wound by an electrode material winding apparatus according to an embodiment.

The winding apparatus 100 may wind the electrode material M to manufacture a jelly roll JR as illustrated in FIG. 4.

For the winding apparatus 100, the processing unit 10 processes at least one end portion of upper and lower ends of the electrode material M so as to allow an electrode tab T connected to an electrode plate to be formed in a predetermined pattern at the end portion, the winding unit 20 winds the electrode material M into a cylindrical jelly roll JR, the guide unit 30 comes into contact with a winding surface on which the electrode material M is wound to apply a pressure to the winding surface so as to allow the electrode tab T to be arranged in a specific region SZ corresponding to a part of at least one cross section of upper and lower surfaces of the jelly roll JR, the detection unit 40 detects an input length of the electrode material M introduced at a front end of the winding unit 20, and the control unit 50 determines an arrangement state of the electrode tab T based on a result of the detection by the detection unit 40, and controls a position of the guide unit 30 according to a result of the determination to adjust the pressure, so as to wind the electrode material M into the jelly roll JR as illustrated in FIG. 4.

Hereinafter, a specific embodiment of the winding apparatus 100 will be described with further reference to FIGS. 4 to 8.

In the winding apparatus 100, the processing unit 10 processes at least one end portion of upper and lower ends of the electrode material M so as to allow an electrode tab T connected to an electrode plate to be formed in a predetermined pattern at the end portion.

Figure 5:
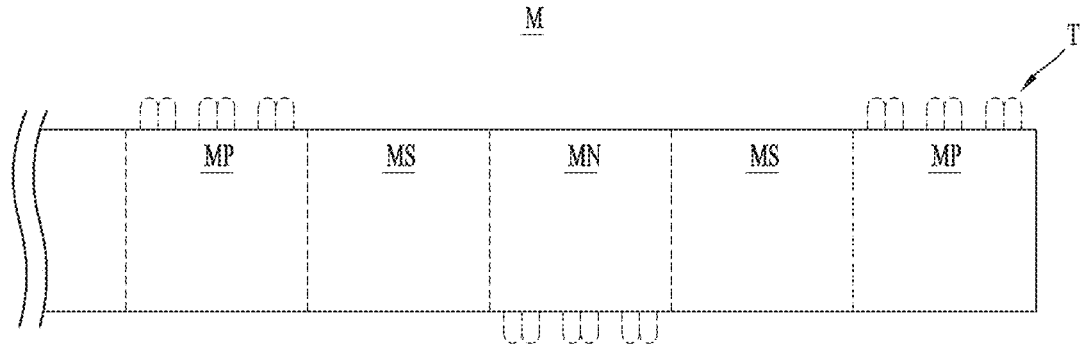
FIG. 5 is an exemplary diagram showing an example of an electrode material processed by an electrode material winding apparatus according to an embodiment.

That is, the processing unit 10 may process at least one end portion of upper and lower ends of the electrode material M so as to allow the electrode tab T to be formed in the predetermined pattern at the end portion, as illustrated in FIG. 5.

Accordingly, when the electrode material M is wound in the winding unit 20, the electrode tab T formed in the predetermined pattern may protrude into a cross section of the jelly roll JR as illustrated in FIG. 4.

The processing unit 10 may be driven under the control of the control unit 50 to process at least one end portion of upper and lower ends of the electrode material M so as to allow the electrode tab T to be formed in the predetermined pattern that is preset at the end portion.

That is, the processing of the electrode material M in the processing unit 10 may be controlled by the control unit 50.

Additionally, the setting of the predetermined pattern may be changed by the control unit 50.

The electrode material M may include electrodes (MP and MN) divided into a cathode MP and a anode MN, as illustrated in FIG. 5, and a separator MS that separates the cathode MP and the anode MN.

Here, the electrode material M is formed so as to allow the cathode MP, the separator MS, and the anode MN to be separated, and thus each of the cathode MP, the separator MS, and the anode MN may be wound in one turn unit.

That is, for the electrode material M, the cathode MP may be wound with one turn, the separator MS may be wound with one turn around a part where the cathode MP is wound, and the anode MN may be wound with one turn around a part where the separator MS is wound.

The electrode material M may be formed so as to allow the cathode MP, the separator MS, and the anode MN to be separated by a number corresponding to the number of turns of the jelly roll JR.

That is, the electrode material M may include a plurality of cathodes MP, a plurality of separators MS, and a plurality of anodes MN, which are separated from one another.

The electrode material M may be formed in an order in which the electrodes (MP and MN) and the separator MS are wound in the winding unit 20.

The electrode material M may form one anode MN between one cathode MP and a next cathode MP.

In addition, the electrode material M may form one cathode MP between one anode MN and a next anode MN.

In this case, the electrode material M may be formed in an order in which the separator MS is arranged between the cathode MP and the anode MN.

That is, for the electrode material M, the cathode MP and the anode MN are alternately arranged, and the separator MS may be arranged between the anode MP and the cathode MN, respectively.

Accordingly, when the electrode material M is wound in the winding unit 20, it may be wound in an order of the cathode MP—the separator MS—the anode MN—the separator MS—the cathode MP.

Meanwhile, the electrode material M may have different lengths of the electrodes (MP and MN) and the separator MS depending on the position (point).

For example, the lengths of the electrodes (MP and MN) and the separator MS may increase from a position corresponding to an initial number of turns of the jelly roll JR to a position corresponding to a later number of turns.

In this case, the lengths of the electrodes (MP and MN) and the separator MS may increase in proportion to a diameter or circumferential length of the jelly roll JR.

The processing unit 10 may process an end portion of a part corresponding to the electrode MP and MN so as to allow the electrode tab T to be formed at the end portion.

That is, the electrode tab T may be formed at least one end portion of the cathode MP and the anode MN in the electrode material M.

The processing unit 10 may process, when processing the electrode tab T to be formed at an end portion of the cathode MP, an upper end portion of the cathode MP so as to allow the electrode tab T to be formed at the upper end portion of the cathode MP.

The processing unit 10 may also process, when processing the electrode tab T to be formed at an end portion of the anode MN, a lower end portion of the anode MN so as to allow the electrode tab T to be formed at the lower end portion of the anode MN.

That is, the electrode tab T may be formed at the upper end portion of the cathode MP in the cathode MP and at the lower end portion of the anode MN in the anode MN.

Accordingly, when the electrode material M is wound, the electrode tab T of the cathode MP may protrude from a top surface of the jelly roll JR, and the electrode tab T of the anode MN may protrude from a bottom surface of the jelly roll JR.

In this case, a protruding electrode tab T on the top surface of the jelly roll JR may be connected to a cathode plate, and a protruding electrode tab T on the bottom surface of the jelly roll JR may be connected to an anode plate.

The processing unit 10 may process at least one of the upper end portion of the cathode MP and the lower end portion of the anode MN so as to allow the electrode tab T to be formed on at least one of the upper end portion of the cathode MP and the lower end portion of the anode MN.

Hereinafter, for convenience of explanation, it will be mainly described an example in which the processing unit 10 processes an upper end portion of the cathode MP so as to allow the electrode tab T to be formed at the upper end portion of the cathode MP, but a specific implementation of the winding apparatus 100 may also be implemented as an example in which the electrode tab T is formed at a lower end portion of the anode MN and as an example in which the electrode tab T is formed at an upper end portion of the cathode MP and a lower end portion of the anode MN, respectively, and the contents described below may be applied in the same manner or with modifications to the other embodiments.

The processing unit 10 may process the end portion so as to allow the electrode tab T to be formed in the predetermined pattern on at least one of an upper end portion of the cathode MP and a lower end portion of the anode MN.

The predetermined pattern may be a pattern according to a position of the electrode tab T corresponding to the specific region SZ.

That is, the predetermined pattern may be a pattern in which the electrode tab T is formed, when the electrode material M is wound, at a position where the electrode tab T is arranged in the specific region SZ.

Here, the specific region SZ, which is a partial region of the cross section, as illustrated in FIG. 4, may be a region corresponding to an area connected to the electrode plate.

That is, the electrode tab T may be arranged in the specific region SZ so as to be connected to the electrode plate in the specific region SZ.

The specific region SZ may be a region corresponding to an area welded to the electrode plate.

That is, the specific region SZ may be formed according to an area welded to the electrode plate.

The specific region SZ may be formed in plurality in the cross section.

For example, as illustrated in FIG. 4, the specific region SZ may be formed at each of four locations in a cross direction.

Meanwhile, in the specific region SZ, the electrode tab T may be folded in the same manner in either one direction.

That is, the electrode tab T arranged in the specific region SZ may be folded in the same direction to form the specific region SZ.

The electrode tab T may be folded preferably toward the center of the jelly roll JR so as to partially overlap with the electrode tabs arranged at the front and rear.

Accordingly, the specific region SZ may be formed in such a manner that adjacent electrode tabs are partially stacked as the electrode tab T is folded.

Figure 6:
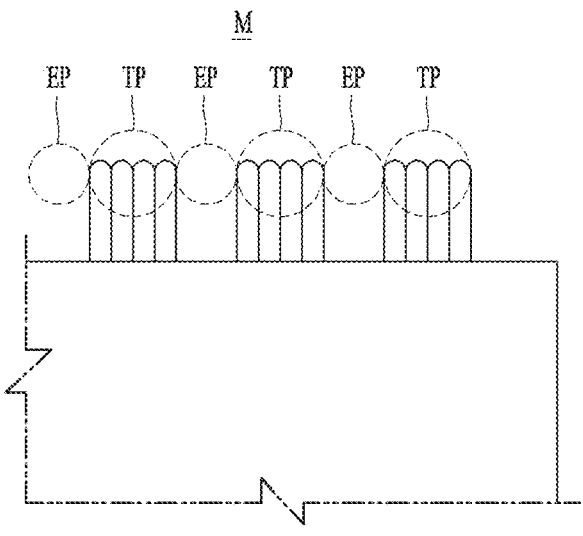
FIG. 6 is an exemplary diagram showing an example of a predetermined pattern of an electrode material processed by an electrode material winding apparatus according to an embodiment.

The predetermined pattern may be a pattern in which a formation group TP where one or more of the electrode tabs T are formed and a non-formation group EP where the electrode tabs T are not formed are alternated, as illustrated in FIG. 6.

Here, the predetermined pattern may include the plurality of formation groups TP and the plurality of non-formation groups EP, respectively.

That is, the predetermined pattern may be formed as a pattern in which the forming group TP is formed in plurality and the non-formation group EP is formed between the formation groups TP.

Accordingly, the predetermined pattern may be formed in such a manner that there is a spacing above a predetermined distance between the formation groups TP.

Here, the formation group TP may be formed at a position corresponding to the specific region SZ, and the non-formation group EP may be formed at a position corresponding to an empty foil region NZ other than the specific region SZ.

Accordingly, when the electrode material M is wound, the formation group TP may form the specific region SZ in the cross section, and the non-formation group EP may form the empty foil region NZ in the cross section.

Meanwhile, the predetermined pattern may vary in a position and formation number of the electrode tabs T and a spacing between the formation groups TP depending on a position (point) of the electrode material T.

For example, the formation number of the electrode tabs T and/or the spacing between the formation groups TP may increase from a position corresponding to an initial number of turns of the jelly roll JR to a position corresponding to a later number of turns.

In this case, the formation number of the electrode tabs T and/or the spacing between the formation groups TP may increase in proportion to a diameter or circumferential length of the jelly roll JR.

The processing unit 10 may notch the end portion so as to allow the electrode tab T to be formed in the predetermined pattern.

That is, the processing unit 10 may be processed to form the electrode tab T in the predetermined pattern by notching the end portion.

The electrode tab T may be formed in the predetermined pattern, and thus the processing unit 10 may process, when the electrode material M is wound, the end portion so as to allow the arrangement of the electrode tab T to form a predetermined shape in the cross section.

Accordingly, when the electrode material M is wound in the winding unit 20, the electrode tab T formed in the predetermined pattern may protrude from the cross section to form a predetermined shape as illustrated in FIG. 4.

The predetermined shape may be a shape in which the empty foil regions NZ are formed on both sides of the specific region SZ in which the electrode tabs T are arranged in a number below a predetermined number.

Here, the empty foil region SZ may be a region in which the electrode tabs T are arranged in a number below the predetermined number in any region that is separated from the specific region SZ.

Figure 7A:
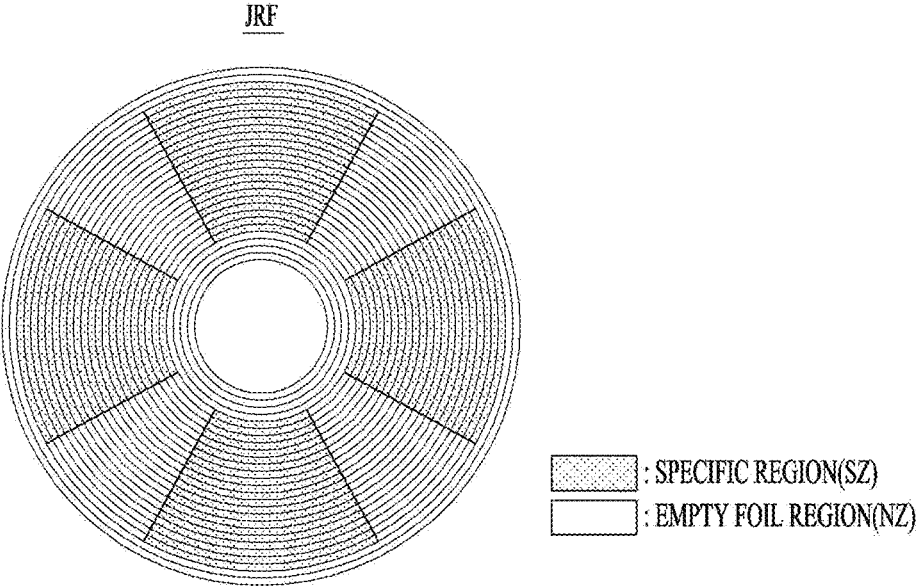

The predetermined shape is a shape formed in the cross section JRF of the jelly roll JR according to the predetermined pattern, and may be a shape in which the specific region SZ is formed in plurality, and the empty foil regions NZ are formed on both sides of the specific regions SZ, as illustrated in FIG. 7A.

In this case, the predetermined shape may be formed by the division of the specific region SZ and the empty foil region NZ formed in a fan shape, and the division of the specific region SZ and the empty foil region NZ may be visibly distinguished by the electrode tab T protruding from the specific region SZ.

Figure 7B:
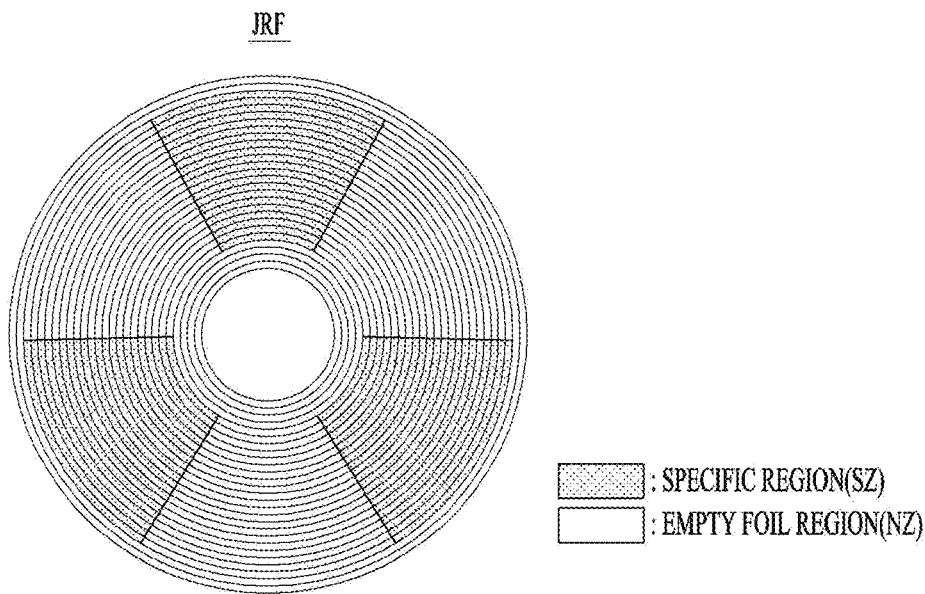

Meanwhile, the predetermined shape may be formed in an example other than the example illustrated in FIG. 7A, for example, the specific regions SZ and the empty foil regions NZ may be respectively formed in three as illustrated in FIG. 7B, or four of the specific regions SZ may be formed in a cross shape and the empty foil regions NZ may be formed between the four specific regions SZ, respectively, as illustrated in FIG. 7C, or the specific regions SZ and the empty foil regions NZ may be respectively formed in two as illustrated in FIG. 7D.

In this way, when the electrode tab T is formed in the predetermined pattern on the end portion and the predetermined shape is formed in the cross section JRF in such a manner that the specific region SZ and the empty foil region NZ are distinguished, the electrode plate may be welded to the specific region SZ to be electrically connected to the electrode tab T, and an electrolyte may be injected through the empty foil region NZ.

In the winding apparatus 100, the winding unit 20 winds the electrode material M in which the electrode tab T is formed in the predetermined pattern into a cylindrical jelly roll JR.

The winding unit 20 may be configured with a rotating body having a hollow cylindrical structure to rotate in a direction in which the electrode material M is input so as to wind the electrode material M on an circumferential surface when the electrode material M is input.

The winding unit 20 may wind the electrode material M in turn units.

For example, the electrode material M may be wound in one turn unit.

In addition, the winding unit 20 may also wind the electrode material M in a set unit including a plurality of turns.

For example, the electrode material M may be wound in a set unit by winding four turns as one set so as to allow each of the cathode MP, the separator MS, the anode MN and the separator MS to be wound in one turn.

The winding unit 20 may be driven under the control of the control unit 50 to wind the electrode material M into the jelly roll JR.

That is, the winding of the electrode material M in the winding unit 20 may be controlled by the control unit 50.

In this case, the winding unit 20 may receive a pressure from the guide unit 30 to wind the electrode material M.

In the winding apparatus 100, the guide unit 30 comes into contact with a winding surface on which the electrode material M is wound, and applies a pressure to the winding surface so as to allow the electrode tab T to be arranged in the specific region SZ.

The guide unit 30 may include a roller unit 31 that comes into contact with the winding surface to guide the winding of the electrode material M, and a driving unit 32 that is controlled by the control unit 50 to move a position of the roller unit 31.

The roller portion 31 may be configured with a cylindrical structure made of an elastic material to come into contact with the winding surface.

The roller portion 31 may come into contact with the winding surface to apply a pressure to the winding surface while the electrode material M is being wound so as to maintain a tension of the electrode material M.

Accordingly, the roller unit 31 may guide the winding of the electrode material M by applying a pressure to the winding surface so as to allow the electrode material M to be evenly wound on the winding unit 20.

The roller unit 31 may be configured with a rotating body having a cylindrical structure to rotate when the winding unit 20 rotates to wind the electrode material M so as to apply a pressure to the winding surface.

In this case, the roller unit 31 may be driven under the control of the control unit 50 to guide the winding of the electrode material M.

That is, the rotation of the roller unit 31 may be controlled by the control unit 50.

The roller unit 31 may also rotate due to a friction with the winding surface when the winding unit 20 rotates to wind the electrode material M and apply a pressure to the winding surface.

As a diameter of the jelly roll JR increases, the roller unit 31 moves backward from the winding unit 20 so as to allow the pressure applied to the winding surface to be varied.

As the diameter of the jelly roll JR increases, a spacing between the winding unit 20 and the roller unit 31 may decrease, and thus when the pressure applied to the winding surface increases, the winding of the electrode material M may be inaccurate due to the increased pressure, and as a result, as the diameter of the jelly roll JR increases, the roller unit 31 may move backward from the winding unit 20 so as to allow the pressure applied to the winding surface to be adjusted.

In this case, the roller unit 31 may be moved backward from the winding unit 200 by a force pushing from the winding surface due to contact with the winding surface.

Additionally, a position of the roller unit 31 may be changed by the driving unit 32.

The driving unit 32 may be a servo motor provided to be coupled to the roller unit 31 on one side of the roller unit 31.

The driving unit 32 may be driven in one axial direction to move the position of the roller unit 31 in the axial direction.

For example, the driving unit 32 may be driven in a direction of the winding unit 20 to move the position of the roller unit 31 toward the winding unit 20, or driven in a direction opposite to the winding unit 20 to move the position of the roller unit 31 in a direction opposite to the winding unit 20.

The driving unit 32 may be driven under the control of the control unit 50 to move the position of the roller unit 31.

That is, a positional movement of the roller unit 31 by the driving unit 32 may be controlled by the control unit 50.

In this way, the guide unit 30 may adjust a pressure applied to the winding surface so as to allow the electrode tab T to be arranged in the specific region SZ through the driving unit 32 that moves a position of the roller unit 31 to vary the pressure applied to the winding surface.

For example, when the pressure applied to the winding surface needs to increase, the driving unit 32 may be driven to move the position of the roller unit 31 closer to the winding unit 20 so as to increase the pressure applied to the winding surface, and when the pressure applied to the winding surface needs to decrease, the driving unit 32 may be driven to move the position of the roller unit 31 away from the winding unit 20 so as to decrease the pressure applied to the winding surface.

In the winding apparatus 100, the detection unit 40 may be an encoder that detects the input length at a front end of the winding unit 20.

The detection unit 40 may be driven under the control of the control unit 50 to detect the input length.

The detection unit 40 may detect an input length of the electrode material M fed from the processing unit 10 to the winding unit 20, and transmit a result of the detection to the control unit 50.

Accordingly, the control unit 50 may calculate a total length (total amount) of the electrode material M introduced into the winding unit 20 based on the detection result, and determine the arrangement state based on a result of the calculation.

In the winding apparatus 100, the control unit 50 determines the arrangement state in the cross section JRF based on a result of the detection by the detection unit 40, and controls a position of the guide unit 30 according to a result of the determination to adjust a pressure applied to the winding surface.

For example, when it is determined that the arrangement state requires a correction, a position of the guide unit 30 may be controlled to move so as to vary a pressure applied to the winding surface.

The control unit 50 may control a position of the guide unit 30 by determining the arrangement state for each predetermined cycle.

The predetermined cycle is a determination cycle of the arrangement state preset in the control unit 50, and may be a cycle according to a turn or winding unit of the winding unit 20.

For example, when the winding unit 20 winds the electrode material M in a set of four turns, the predetermined cycle may be set to one turn or one set.

When the predetermined cycle is set to one turn, the control unit 50 may determine the arrangement state for each turn of the winding unit 20 to control the position of the guide unit 30, and when the predetermined cycle is set to a set of four turns, the control unit 50 may determine the arrangement state for each four turns of the winding unit 40 to control the position of the guide unit 30.

Accordingly, the control unit 50 may adjust the pressure for each predetermined cycle.

The predetermined cycle may also be set to any number of turns.

For example, it may be set to 10 turns, so as to allow the control unit 50 to control the position of the guide unit 30 by determining the arrangement state for each 10 turns of the winding unit 20.

Meanwhile, the predetermined cycle may be set to a different cycle depending on a time or the input length.

For example, an initial winding of the electrode material M may be set to a cycle of A, and a later winding may be set to a cycle of B, which is smaller than A.

In this case, the control unit 50 may allow the cycle of determining the arrangement state and controlling the position of the guide unit 30 to be shorter during the later winding than during the initial winding when the diameter of the jelly roll JR is smaller.

Accordingly, during the later winding in which the diameter of the jelly roll JR increases and the winding of the electrode material M becomes difficult, accurate and stable winding may be achieved while increasing a number of adjustments to the pressure.

The predetermined cycle may be arbitrarily set by a user, and the setting may be changed while operating the winding apparatus 100.

In this way, the control unit 50 that controls a position of the guide unit 30 according to a result of determining the arrangement state may adjust the pressure by maintaining, moving the position of the guide unit 30 forward or backward according to the result of the determination.

That is, the control unit 50 may adjust the pressure by maintaining, moving a position of the guide unit 30 forward or backward depending on whether the correction of the arrangement state is required.

In this case, the control unit 50 may determine whether the correction of the arrangement state is required for each predetermined cycle, and adjust the pressure by maintaining, moving a position of the guide unit 30 forward or backward for each predetermined cycle.

The control unit 50 may adjust the position of the guide unit 30 to move forward to the winding unit 20 so as to increase the pressure, and may adjust the position of the guide unit 30 to move backward from the winding unit 20 so as to decrease the pressure.

That is, when it is determined that the correction of the arrangement state is required, the control unit 50 may adjust the position of the guide unit 30 to move forward to the winding unit 20 so as to increase the pressure, or adjust the position of the guide unit 30 to move backward from the winding unit 20 so as to decrease the pressure.

The control unit 50 may calculate one of the standard values of the jelly roll JR based on the detection result, compare between the standard value and a reference value according to a number of winding turns of the electrode material M, and determine the arrangement state based on a result of the comparison.

In addition, the control unit 50 may calculate the standard value based on the detection result, compare between the standard value and the reference value according to the number of winding turns of the electrode material M, and determine whether the correction of the arrangement state is required based on a result of the comparison.

Here, the control unit 50 may determine whether the electrode tab T is arranged in the specific region SZ based on the comparison result.

That is, the control unit 50 may compare the standard value and the reference value, and determine whether the electrode tab T is wound so as to be arranged in the specific region SZ based on a difference between the standard value and the reference value.

The standard value may be a value calculated from one of the standards of the jelly roll JR.

The standard value may be, for example, one or more of a diameter, a circumferential length, a cross-sectional area, a circumferential area, and a weight of the jelly roll JR.

The reference value may be a numerical value set (or stored) in the form of a table of reference values for the standard values according to the number of winding turns.

For example, when the reference value is a reference value for a circumferential length of the jelly roll JR, 1 turn may be set as a [mm], 2 turns may be set as b [mm], and n turns may be set as n [mm].

The standard value may preferably be a diameter or radius of the jelly roll JR.

In this case, the reference value may be a reference diameter or radius of the jelly roll JR according to the number of winding turns.

That is, the control unit 50 may determine the arrangement state based on a diameter or radius of the jelly roll JR.

For example, when the calculated diameter (standard value) matches a diameter of a reference value, it may be determined that the winding of the electrode material M is wound as a reference and the electrode tab T is wound so as to be arranged as a reference in the specific region SZ, and when the calculated diameter (standard value) does not match the diameter of the reference value, it may be determined that the winding of the electrode material M is not wound as a reference and the electrode tab T is wound so as not to be arranged as a reference in the specific region SZ.

The control unit 50 may calculate a total length (total amount) of the electrode material M introduced into the winding unit 20 based on the detection result, and calculate the standard value based on a result of the calculation and a current number of winding turns.

For example, the standard value may be calculated based on the input length compared to the current number of winding turns.

The control unit 50 may calculate the standard value based on the calculation result and the current number of winding turns, determine whether the correction of the arrangement state is required according to a result of comparing the standard value with the reference value, and control a position of the guide unit 30 based on a result of the determination.

The control unit 50 may determine that the correction of the arrangement state is not required when the difference between the standard value and the reference value is below the first reference, and maintain the position of the guide unit 30.

Here, the difference between the standard value and the reference value may refer to an absolute value.

That is, as a result of comparing the standard value with the reference value, when an absolute value of a difference between the standard value and the reference value is below the first reference, the control unit 50 may determine that the electrode material M is wound as a reference and the electrode tab T is arranged as a reference in the specific region SZ so as to determine that the correction of the arrangement state is not required.

Accordingly, the control unit 50 may determine that the correction of the arrangement state is not required and thus the adjustment of the pressure is not required so as to maintain the position of the guide unit 30.

The control unit 50 may determine that the correction of the arrangement state is required when a difference between the standard value and the reference value is above the first reference so as to move the position of the guide unit 30.

That is, as a result of comparing the standard value with the reference value, when an absolute value of a difference between the standard value and the reference value is above the first reference, the control unit 50 may determine that the electrode material M is not wound as a reference and the electrode tab T is not arranged as a reference in the specific region SZ so as to determine that the correction of the arrangement state is required.

Accordingly, when it is determined that the correction of the arrangement state is required and thus the adjustment of the pressure is required, the control unit 50 may move the position of the guide unit 30 forward or backward.

In this case, the control unit 50 may move the position of the guide unit 30 forward to the winding unit 20 when the standard value is greater than the reference value.

That is, when the standard value is greater than the reference value by more than the first reference, since the pressure is lower than an appropriate pressure of a current number of winding turns and the standard value becomes greater than the reference value as the electrode material (M) is loosely wound, the control unit 50 may determine that the correction of the arrangement state is required and adjust the position of the guide unit 30 to move forward to the winding unit 20 so as to increase the pressure applied to the winding surface.

Accordingly, the control unit 50 may determine that the correction of the arrangement state is required and thus the adjustment of the pressure is required, and move, when the standard value is greater than the reference value, the position of the guide unit 30 forward to the winding unit 20 so as to increase the pressure.

In this case, the control unit 50 may determine a forward distance of the guide unit 30 depending on a degree to which the standard value is greater than the reference value.

That is, the control unit 50 may adjust a degree of increase in the pressure by varying a forward distance of the guide unit 30 depending on a degree of difference between the standard value and the reference value.

For example, when the difference between the standard value and the reference value is A, a forward distance of the guide unit 30 may be determined as X so as to increase the pressure by a, and when the difference between the standard value and the reference value is B, which is greater than A, the forward distance of the guide unit 30 may be determined as Y, which is greater than X, so as to increase the pressure by b, which is greater than a.

In addition, the control unit 50 may move the position of the guide unit 30 backward from the winding unit 20 when the standard value is smaller than the reference value.

That is, when the standard value is less than the reference value by more than the first reference, since the pressure is greater than an appropriate pressure of a current number of winding turns and the standard value becomes less than the reference value as the electrode material (M) is tightly wound, the control unit 50 may determine that the correction of the arrangement state is required and adjust the position of the guide unit 30 to move backward from the winding unit 20 so as to decrease the pressure applied to the winding surface.

Accordingly, the control unit 50 may determine that the correction of the arrangement state is required and thus the adjustment of the pressure is required, and move, when the standard value is smaller than the reference value, the position of the guide unit 30 backward from the winding unit 20 so as to decrease the pressure.

In this case, the control unit 50 may determine a backward distance of the guide unit 30 depending on a degree to which the standard value is smaller than the reference value.

That is, the control unit 50 may adjust a degree of to a decrease in the pressure by varying a backward distance of the guide unit 30 depending on a degree of difference between the standard value and the reference value.

For example, when the difference between the standard value and the reference value is C, a forward distance of the guide unit 30 may be determined as P so as to decrease the pressure by c, and when the difference between the standard value and the reference value is D, which is greater than C, the backward distance of the guide unit 30 may be determined as Q, which is greater than P, so as to decrease the pressure by d, which is greater than c.

Meanwhile, when the difference between the standard value and the reference value is above a second reference that exceeds the first reference, the control unit 50 may determine that the correction of the specific pattern is further required to change the setting of the processing unit 10.

That is, when a difference between the standard value and the reference value is above the second reference, the control unit 50 may determine that it is necessary to further adjust the formation position of the electrode tab T so as to correct the arrangement state, and thus may change the setting of the processing unit 10.

In this case, the control unit 50 may change the setting of the predetermined pattern so as to allow the formation position of the electrode tab T to be changed.

Figure 8:
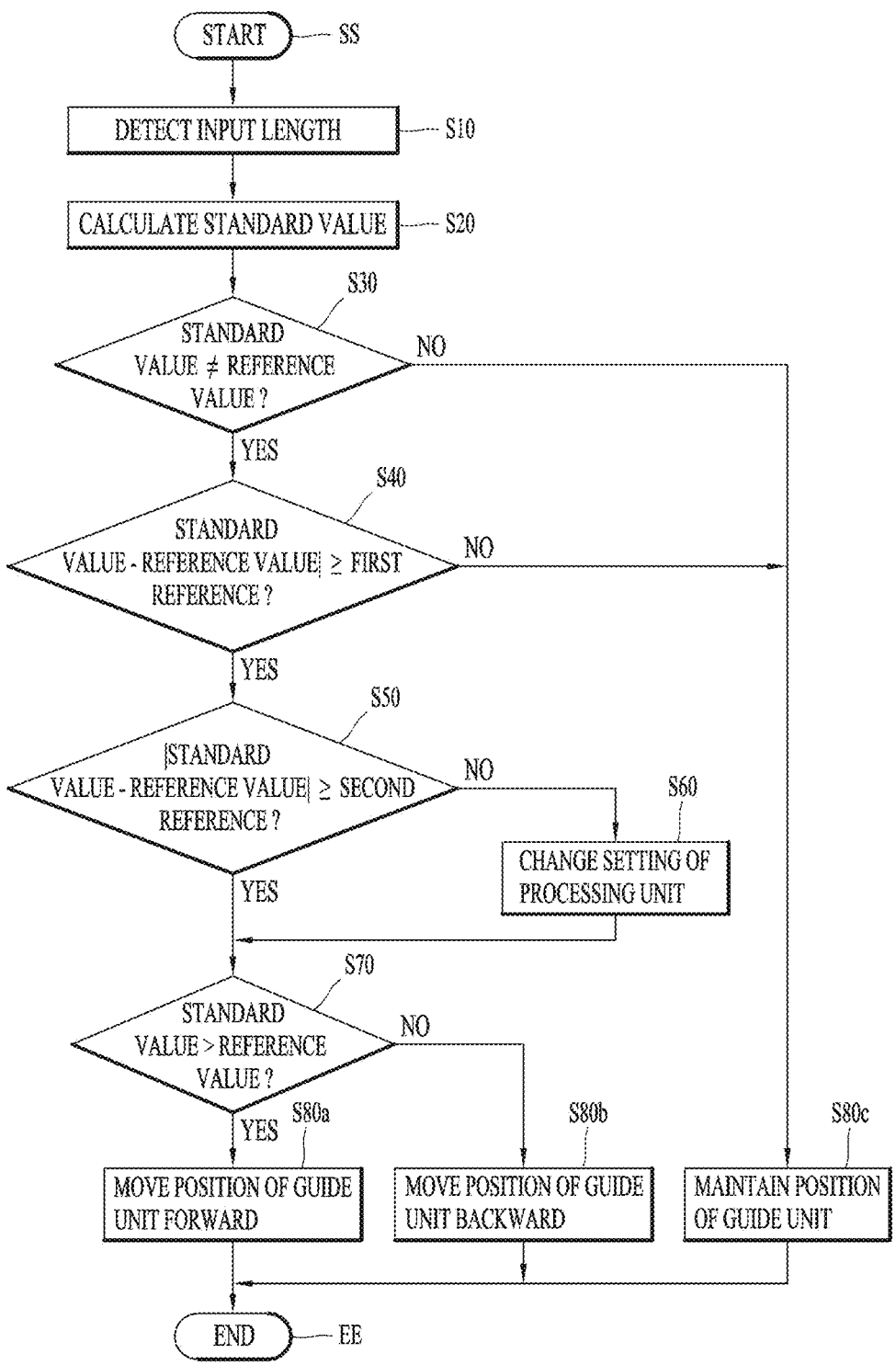
FIG. 8 is a flowchart showing an order of position adjustment of a guide unit in an electrode material winding apparatus according to an embodiment.

The above-described process of controlling a position of the guide unit 30 to adjust a pressure applied to the winding surface may be performed in an order illustrated in FIG. 8.

First, when the detection unit 40 detects the input length (S10), the detection unit 40 transmits a result of the detection to the control unit 50.

The control unit 50, upon receiving the detection result, calculates the standard value based on the detection result (S20), compares the standard value with the reference value (S30), and controls the position of the guide unit 30 according to a result of the comparison (S80*a* to S80*c*).

As a result of comparing between the standard value and the reference value (S30), when the standard value matches the reference value, the guide unit 30 may maintain the position (S80*c*).

That is, when the standard value matches the reference value, the control unit 50 may maintain the position of the guide unit 30 (S80*c*) to maintain a pressure applied to the winding surface.

Meanwhile, as a result of comparing between the standard value and the reference value (S30), when the standard value does not match the standard value, an absolute value of the difference between the standard value and the reference value may be compared with the first reference (S40), and depending on a result of the comparison, the guide unit 30 may move the position (S80*a* or S80*b*) or maintain the position (S80*c*).

That is, when the standard value does not match the reference value, the control unit 50 may increase or decrease the pressure by moving the position of the guide unit 30 forward or backward (S80*a* or S80*b*) according to a result of comparing between the absolute value and the first reference (S40), or maintain the pressure by maintaining the position of the guide unit 30 (S80*c*).

As a result of comparing between the absolute value and the first reference (S40), when the absolute value is below the first reference, the guide unit 30 may maintain the position (S80*c*).

That is, when the absolute value is below the first reference, the control unit 50 may maintain the position of the guide unit 30 (S80*c*) to maintain a pressure applied to the winding surface.

As a result of comparing between the absolute value and the first reference (S40), when the absolute value is above the first reference, the absolute value may be compared with the second reference (S50), and the guide unit 30 may move the position forward (S80*a*) or backward (S80*b*) depending on a result of the comparison.

That is, when the absolute value is above the first reference, the control unit 50 may increase or decrease the pressure by moving the position of the guide unit 30 forward or backward (S80*a* or S80*b*) according to a result of comparing between the absolute value and the second reference (S50).

As a result of comparing between the absolute value and the second reference (S50), when the absolute value is below the second reference, magnitudes of the standard value and the reference value are compared (S60), and the guide unit 30 may move the position forward (S80*a*) or backward (S80) depending on a result of the comparison.

That is, when the absolute value is below the second reference, the control unit 50 may increase or decrease the pressure by moving the position of the guide unit 30 forward or backward (S80*a* or S80*b*) according to a result of comparing between magnitudes of the standard value and the reference value (S60).

Meanwhile, as a result of comparing the absolute value with the second reference (S50), when the absolute value is above the second reference, the setting of the processing unit 10 may be changed (S70), and then the magnitudes of the standard value and the reference value may be compared with each other (S60).

That is, when the absolute value is above the second reference, the control unit 50 may change the setting of the predetermined pattern (S70) to change the processing of the processing unit 10, and then, based on a result of comparing between the magnitudes of the standard value and the reference value (S60), the position of the guide unit 30 may be moved forward or backward (S80*a* or S80*b*) to increase or decrease the pressure.

As a result of comparing between the magnitudes of the standard value and the reference value (S60), when the standard value is larger than the reference value, the guide unit 30 may move the position forward (S80*a*).

That is, when the standard value is greater than the reference value, the control unit 50 may move the position of the guide unit 30 forward (S80*a*) to increase the pressure.

As a result of comparing between the magnitudes of the standard value and the reference value (S60), when the standard value is smaller than the reference value, the guide unit 30 may move the position backward (S80*b*).

That is, when the standard value is smaller than the reference value, the control unit 50 may move the position of the guide unit 30 backward (S80*b*) to decrease the pressure.

By adjusting the pressure through the winding apparatus 100 and winding the electrode material M in such a process, the electrode material M may be wound so as to allow the electrode tab T to be arranged in the specific region SZ.

Although embodiments of the winding apparatus 100 have been described so far, the described embodiments may be modified in various ways without departing from the scope of the present disclosure, and the scope of the present disclosure should not be limited to the described embodiments, but should be defined not only by the claims described below but also by equivalents of the claims.

DESCRIPTION OF SYMBOLS

10: Processing unit 20: Winding unit
30: Guide unit 40: Detection unit
50: Control unit 100: Electrode material winding apparatus

The invention claimed is:

1. An electrode material winding apparatus that winds an electrode material, the apparatus comprising:
 a processing unit that processes at least one end portion of upper and lower ends of the electrode material so as to allow an electrode tab connected to an electrode plate to be formed in a predetermined pattern at the end portion;
 a winding unit that winds the electrode material into a cylindrical jelly roll;
 a guide unit that comes into contact with a winding surface on which the electrode material is wound to apply a pressure to the winding surface so as to allow the electrode tab to be arranged in a specific region corresponding to a part of at least one cross section of upper and lower surfaces of the jelly roll;
 a detection unit that detects an input length of the electrode material introduced at a front end of the winding unit; and
 a control unit that determines an arrangement state of the electrode tab based on a result of the detection by the detection unit, and controls a position of the guide unit according to a result of the determination to adjust the pressure.

2. The apparatus of claim 1, wherein the electrode material comprises:
 electrodes divided into a cathode and an anode; and
 a separator that separates the cathode and the anode.

3. The apparatus of claim 2, wherein the processing unit processes an end portion of a part corresponding to the electrode so as to allow the electrode tab to be formed at the end portion.

4. The apparatus of claim 1, wherein the predetermined pattern is a pattern according to a position of the electrode tab corresponding to the specific region.

5. The apparatus of claim 4, wherein the predetermined pattern is a pattern in which a formation group where one or more electrode tabs are formed and a non-formation group where the electrode tabs are not formed are alternated.

6. The apparatus of claim 1, wherein the processing unit notches the end portion so as to allow the electrode tab to be formed in the predetermined pattern.

7. The apparatus of claim 1, wherein the processing unit processes, when the electrode tab is formed in the predetermined pattern and the electrode material is wound, the end portion to allow an arrangement of the electrode tab to form a predetermined shape in the cross section.

8. The apparatus of claim 7, wherein the predetermined shape is a shape in which empty foil regions where the electrode tabs are arranged below a predetermined number are formed on both sides of the specific region.

9. The apparatus of claim 1, wherein the guide unit comprises:

a roller unit that comes into contact with the winding surface to guide the winding of the electrode material; and a driving unit that is controlled by the control unit to move a position of the roller unit.

10. The apparatus of claim 1, wherein the control unit determines the arrangement state for each predetermined cycle to control a position of the guide unit.

11. The apparatus of claim 1, wherein the control unit adjusts the pressure by maintaining, moving a position of the guide unit forward or backward according to the determination result.

12. The apparatus of claim 11, wherein the control unit adjusts the position of the guide unit to move forward to the winding unit so as to increase the pressure, and adjusts the position of the guide unit to move backward from the winding unit so as to decrease the pressure.

13. The apparatus of claim 1, wherein the control unit calculates one of standard values of the jelly roll based on the detection result, compares the standard value and a reference value according to a number of winding turns of the electrode material, and determines whether a correction of the arrangement state is required based on a result of the comparison.

14. The apparatus of claim 13, wherein the control unit determines, when a difference between the standard value and the reference value is below a first reference, that the correction of the arrangement state is not required, and maintains the position of the guide unit.

15. The apparatus of claim 13, wherein the control unit determines, when the difference between the standard value and the reference value is above the first reference, that the correction of the arrangement state is required, and moves the position of the guide unit.

16. The apparatus of claim 15, wherein the control unit moves the position of the guide unit forward to the winding unit when the standard value is greater than the reference value.

17. The apparatus of claim 16, wherein the control unit determines a forward distance of the guide unit according to a degree to which the standard value is greater than the reference value.

18. The apparatus of claim 15, wherein the control unit moves the position of the guide unit backward from the winding unit when the standard value is smaller than the reference value.

19. The apparatus of claim 18, wherein the control unit determines a backward distance of the guide unit according to a degree to which the standard value is smaller than the reference value.

20. The apparatus of claim 15, wherein the control unit determines, when a difference between the standard value and the reference value is above a second reference that exceeds the first reference, that the correction of the specific pattern is further required, and changes the setting of the processing unit.

* * * * *